United States Patent [19]
Bennett et al.

[11] 3,891,555
[45] June 24, 1975

[54] AQUARIUM FILTER WITH REPLACEABLE CARTRIDGE

[75] Inventors: John P. Bennett, Portola Valley; George D. Bliss, Palo Alto, both of Calif.; Michael New, Marlow, England

[73] Assignee: Syntex (U.S.A.) Inc., Palo Alto, Calif.

[22] Filed: Feb. 4, 1974

[21] Appl. No.: 439,094

[52] U.S. Cl. ............ 210/169; 210/261; 210/335
[51] Int. Cl. .................................... E04h 3/20
[58] Field of Search .......... 210/169, 232, 238, 239, 210/282, 322, 330, 335, 416, 463, 261; 137/268

[56] References Cited
UNITED STATES PATENTS

| | | | |
|---|---|---|---|
| 2,334,802 | 11/1943 | Zuckermann | 210/235 |
| 2,773,828 | 12/1956 | Schiaro | 210/169 |
| 3,247,826 | 4/1966 | Girard | 210/169 X |
| 3,301,402 | 1/1967 | Falkenberg et al. | 210/169 |
| 3,347,211 | 10/1967 | Falkenberg et al. | 210/169 X |
| 3,390,695 | 7/1968 | King et al. | 137/268 |
| 3,460,562 | 8/1969 | Moulder | 137/268 |
| 3,512,648 | 5/1970 | Bittner et al. | 210/239 X |
| 3,643,801 | 2/1972 | Zenemko | 210/169 |
| 3,770,128 | 11/1973 | Kast | 210/169 |
| 3,771,660 | 11/1973 | Smith | 210/282 |

FOREIGN PATENTS OR APPLICATIONS 663,562  12/1951  United Kingdom ............ 210/169

Primary Examiner—Theodore A. Granger
Attorney, Agent, or Firm—Tom M. Moran; Lawrence S. Squires

[57] ABSTRACT

A filter for the purification and aeration of the water in aquariums and aquaculture pools comprises a dual walled container adapted to receive a replaceable, disposable filter cartridge. The lower portion of the outer container wall is provided with perforations acting as inlets for aquarium water. The upper end of the container is fitted with a removable cap to which there are permanently attached a pair downwardly extending concentric tubular members which provide an air supply tube and a water discharge tube. These members extend into the interior of a centrally-located tubular inner container wall which acts as a sump. The space between the outer container wall and the outer surface of the tubular sump is occupied by a plurality of annular filter cartridges composed and arranged in layers which can serve as a filter medium as well as a storage unit for slow release type feed or medication compositions.

7 Claims, 6 Drawing Figures

AQUARIUM FILTER WITH REPLACEABLE CARTRIDGE

BACKGROUND OF THE INVENTION

The present invention relates to a filter unit suitable for insertion into the water in an aquarium or other aquaculture pool used for the containment and rearing of fish, crustacea, and the like.

After a period of use, aquarium water becomes contaminated with organic waste, excess food, and undesirable organisms such as algae. These polluting products must be periodically or intermittently removed to maintain the marine life in the aquarium water, and to eliminate odors and unsightly clouding or discoloration. Moreover, the necessary oxygen level must be maintained in the aquarium water. The means employed in the prior art to achieve these objectives have included passing the aquarium water through filter beds containing glass wool, sand, charcoal, or other filtration agents, coupled with aeration means. A typical arrangement of this type is that disclosed in U.S. Pat. No. 3,247,826.

In view of the tendency of fixed filter beds and the like to become clogged after prolonged use, it has also been proposed to utilize filtration means in the form of removable and replaceable filter cartridges, as exemplified by U.S. Pat. Nos. 3,292,792, 3,301,402, and 3,313,421. The cartridge filtration devices of the prior art have tended to be bulky and cumbersome in operation, particularly with regard to the actual replacement of the cartridge and the means employed to connect the air supply and water inlet and removal systems.

The art has sought a cartridge type aquarium filter which is simple in design and operation and in which the replacement of the cartridge can be made with a minimum of time and effort.

SUMMARY OF THE INVENTION

In summary, the apparatus of the present invention comprises an elongated tubular container adapted to receive a replaceable, disposable filter cartridge. The container has a closed bottom portion which rests on the upper surface of the gravel bed of the aquarium so as to maintain the container in a substantially vertical position. The container is provided with an upwardly extending outer wall and an upwardly extending inner wall concentric with said outer wall. The lower portion of the outer wall is provided with a plurality of perforations which act as inlet means for a flow of the aquarium water into the filter unit. The upper portion of the outer container wall is adapted to receive a cap or closure member which has a top wall portion and a downwardly extending side wall which engages the exterior of the outer wall of the container. The said inner container wall extends upward to provide a tubular sump member.

The cap or closure member has permanently attached thereto in the central portion of its top wall a pair of concentric downwardly extending tubular members, the outer tube acting as a water discharge means and the inner tube concentric therewith acting as an air inlet. The outer tube has an outside diameter permitting insertion into the tubular sump.

The filter portion itself comprises a plurality of individual filter cartridge units, of which the lowest positioned cartridge rests upon the upper edge of a spacer member surrounding the sump and resting on the container bottom. The desired number of filter cartridges (four in the illustrative embodiment, but not limited thereto) is stacked between the sump wall and the outer container wall so as to fill the space defined by these walls. The individual filter cartridges are in the shape of annular rings having walls of water-permeable material capable of retaining the material constituting the actual filter bed. These are pressed tightly together when the container assembly is put together.

BRIEF DESCRIPTION OF THE DRAWINGS

The invention will be further described and better understood with reference to the accompanying drawings showing a presently preferred embodiment but the invention is not limited thereto since various other embodiments and modifications can be made without departing from the spirit and scope of the invention.

In the drawings.

DETAILED DESCRIPTION OF THE INVENTION

Figure 1:
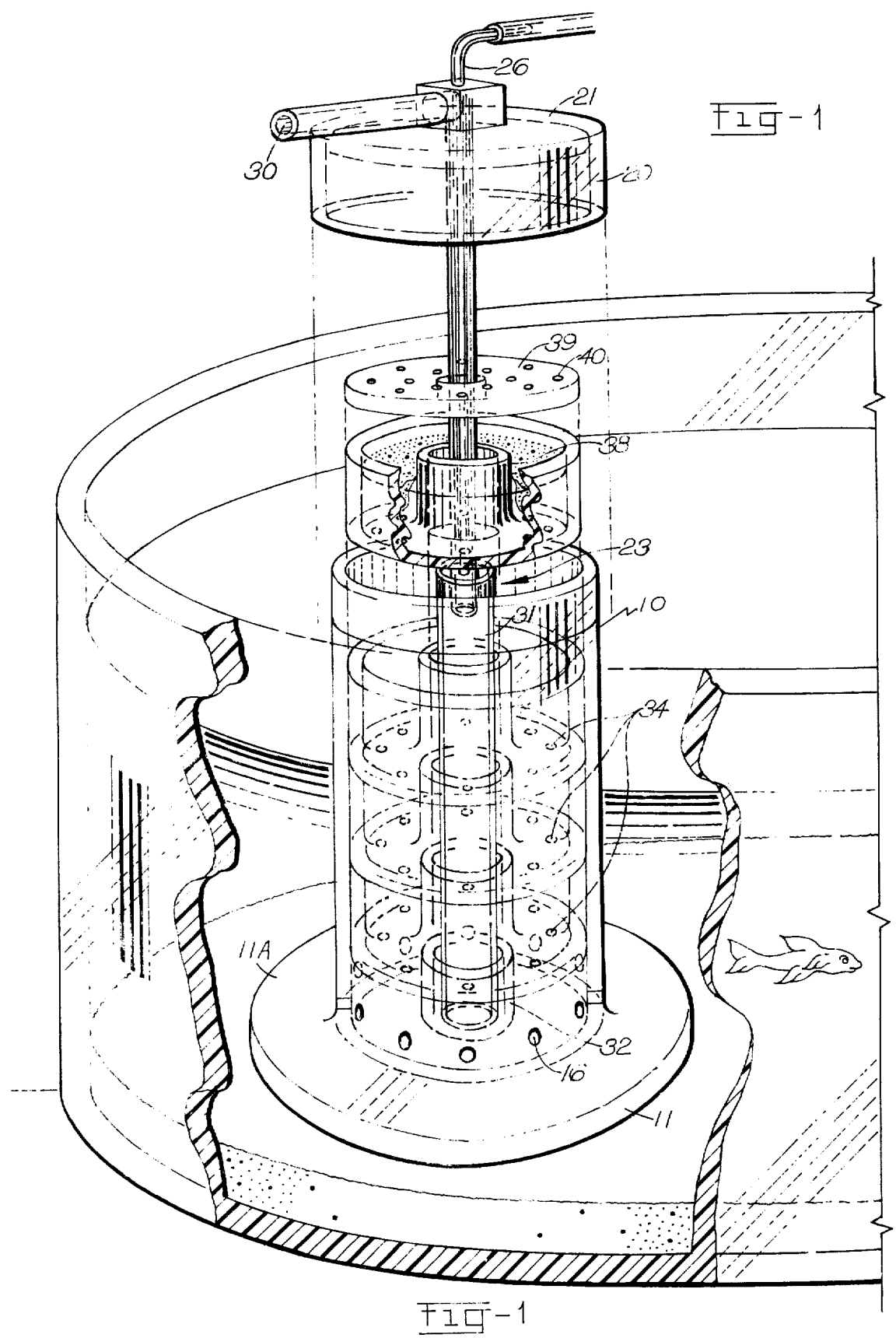
FIG. 1 is an exploded view in perspective of the filter, with a portion of the aquarium wall cut away to show the device of the invention in position in the aquarium.

Referring to FIG. 1, in the embodiment illustrated, the apparatus shown generally at 10, comprises an elongated container having an outer wall 15 and an inner wall 31 concentric therewith. Both walls extend upward about the same distance from a bottom wall portion 11, which is integral with said outer and inner walls. The bottom portion 11 may be in the form of a flange 11A extending outwardly from the outer container wall, the bottom portion 11 being adapted to rest upon the gravel bed 12 of the aquarium 13, the flange imparting increased stability, and aiding in maintaining the container in a substantially vertical position. The container outer wall 15 is provided at its lower portion with a plurality of perforations 16 which permit access of the aquarium water to the filter unit.

The filter unit is contained in the space defined by the inner surface of the container outer wall and the outer surface of the container inner wall. The interior of the inner wall 31 acts as a sump to collect water which passes through the filter unit.

Figures 1A, 2, 3:
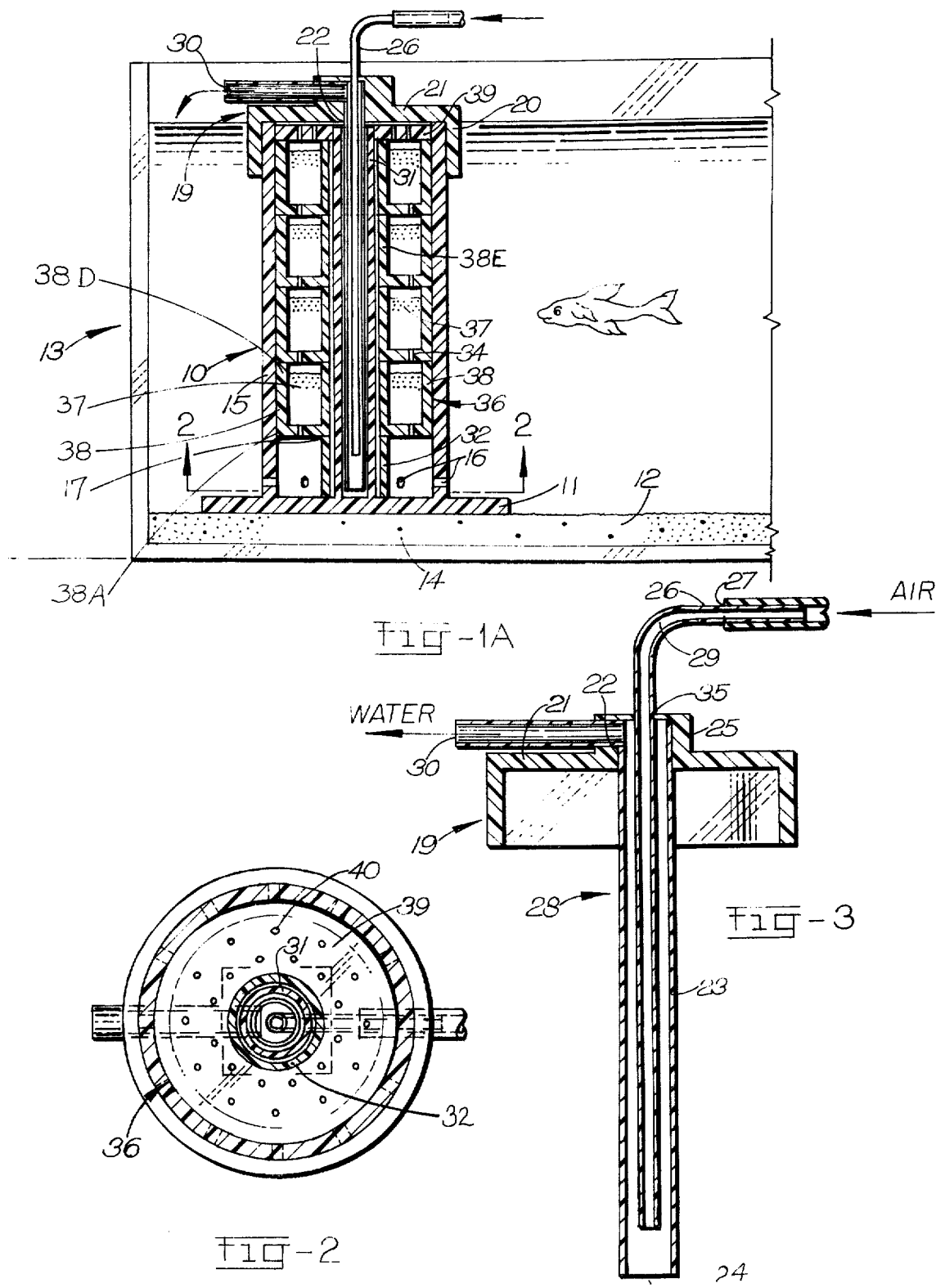
FIG. 1A is a vertical section through an aquarium and through the apparatus of the invention in assembled form.
FIG. 2 is a horizontal section through the apparatus taken on the line 2 — 2 of FIG. 1A.
FIG. 3 is an elevational view of the cap member having the air inlet and water outlet tubes attached thereto.

The filter unit comprises an assembly of individual filter cartridges 38 which are annular in shape and adapted to fit around the exterior of inner container wall 31 so as to be readily inserted or removed. These filter cartridges 38 may be in either of two forms. In the embodiment shown in FIGS. 1, 1A and 2, an annular spacer ring member 32 is slipped downward around inner wall 31 so as to rest on the bottom member 11. The upper edge 17 of this spacer member acts as a support for the lowermost cartridge 38. The cartridge 38 is a tray with a bottom 38A provided with a plurality of perforations 34 permitting access of water to the filter bed 37. The cartridge 38 also has upwardly extending outer wall 38D and inner wall 38E, defining a space for containing filter material 37. The cartridge 38 is open at the top so as to permit communication with the perforations of the similar cartridge superimposed thereon. However, if desired, a screen member of annular shape (not shown) adapted to fit over the sump wall may be inserted to aid in retention of the filter material in the cartridge. The cartridges 38 are filled with loose filter medium 37, described more fully below, through which the aquarium water moves upward. As shown in FIG. 1A, four cartridges 38 are employed, but this is illustrative, and any suitable number may be used depending upon the thickness of each cartridge, the height of the container, and the like.

There is placed over the uppermost cartridge an annular disc 39 acting as a cover plate which is provided with a plurality of perforations 40 (see FIG. 2) through which the filtered water moves and flows therefrom toward the interior of sump 31, therein to be aerated and discharged.

Figure 4:
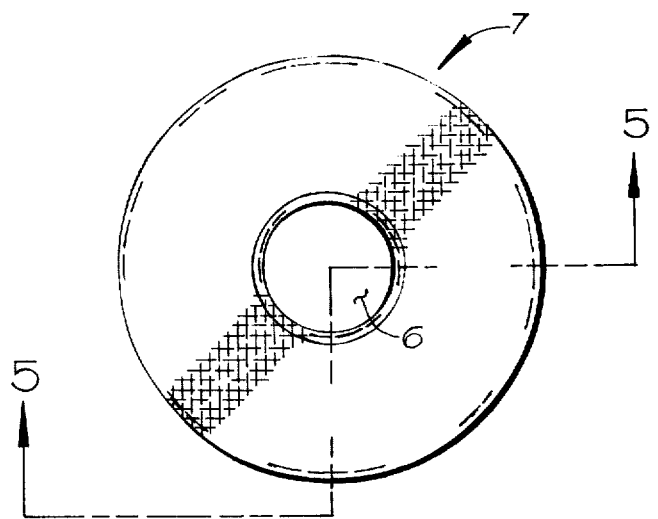
FIG. 4 is a plan view of an individual filter cartridge.
Figure 5:
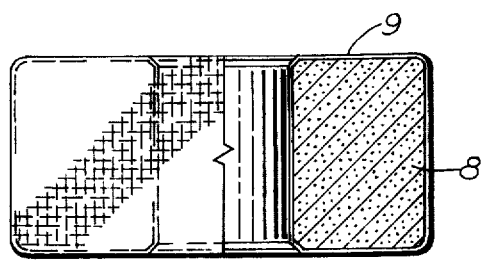
FIG. 5 is a vertical section through the cartridge taken along the line 5 — 5 of FIG. 4.

In an alternative embodiment, there may be employed as filter cartridges a series of individual members of the type shown in FIGS. 4 and 5. These represent a simplified form, in which each cartridge is an individual annular member 7, having an interior hollow portion 6 adapted to slide over the outside of the sump wall 31 for insertion into the apparatus. The cartridge is constructed with a casing of a water-permeable, but retentive material 9, such as plastic or metal wire netting, or water-resistant paper or cloth, the latter being preferred. The casing encloses a bed of suitable filter material 8.

The filter material for both cartridge types may be, for example, a plastic foam, such as a polyurethane foam, or a layer of glass wool, or a layer of sand or finely divided dolomite.

Referring to FIG. 3, the structure of the cap member 19 and its fittings will be seen in greater detail. In the central portion of the top wall 21, there is provided an opening 22 through which there extends downwardly to near the bottom of the sump a tubular member 23, which serves as a conduit for removal of water from the filter. The tube is open at its lower end 24 to receive water from the sump. The water discharge tube 23 is held firmly in place by shoulder 25 which extends from the top of the cap, which forms a recess and closure at 35, at point 35 of which there is an opening for the air inlet tube 29, which at the same time acts as a seal for the upper end of the water discharge tube 23. The latter is provided with a discharge portion 30 permitting discharge of filtered and aerated aquarium water in a direction parallel to the upper surface of the water in the aquarium vessel, as shown in FIG. 1A.

Extending downward through the interior of tube 23 and preferably concentrically therewith is an air inlet conduit 26, the upper end of which extends above the top of cap member 19, and has a bent or curved portion 29 at its upper end, terminating in inlet portion 27, which may be connected to a suitable air supply source (not shown).

The cap member is provided with downwardly extending wall 20, which is adapted to fit over the exterior of container wall 15, with a friction fit, but which may, if desired be provided with interior screw threads to correspond with similar screw threads on the exterior of wall 15, for an alternative type of closure.

The air inlet tube and water discharge tube act as an air lift to remove the filtered water, while at the same time aerating it.

The container, and its cap and attachments, as decribed, form the permanent filter apparatus. These may be made of any suitable water-resistant and non-corrodible material, such as a plastic material, preferably a thermoplastic such as polyvinyl chloride, polyethylene, and the like, which are capable of being heat sealed, for ease in construction.

The layers of filter material may be arranged in any desired order, or in alternations, depending upon the choice of material, in accordance with the requirements of a particular installation. In addition, the filtration unit can serve as a means of slowly dispensing into the aquarium water any desired feed material or medication, by incorporating the latter into the filter media layers.

The operation of the apparatus of the invention includes first installing a set of filter cartridges of either described type in the permanent portion of the device. This is done by removing the cap member with its attached air and water tubes, and slipping the spacer ring and then the cartridges over the outside of the sump tube followed by the perforated cover plate. The cap is then attached to the container portion, and the assembled filter is introduced into the aquarium tank so that the bottom rests on the floor or on the gravel bed of the aquarium tank, and the device is in substantially vertical position and the water level is slightly above the top of the cap but below the water discharge pipe as shown in FIG. 1. The air supply is then connected to the air inlet tube. Aquarium water enters the device through the openings in the container wall lower portion, passing upward through the filter cartridges and perforated cover plate into the hollow cap member, thence entering the sump and moving downward through the interior of the sump where it is aerated and forced by air pressure into and through the water discharge tube and recycled back to the aquarium. When the filter cartridges are to be removed, the cap member is simply unfastened, the used cartridges slipped off the sump tube and discarded, and replaced by fresh cartridges.

It will be apparent that numerous modifications and variations may be made in the apparatus of the invention as described and claimed herein, without department from the essential features and scope thereof.

What is claimed is:

1. A filter device adapted to be introduced into the liquid in an aquarium and the like and positioned in said aquarium for the purification and aeration of the aquarium liquid, comprising, in combination:

a. an elongated tubular container member, said container member having an outer wall and an inner wall concentric therewith and defining an annulus, both walls being integral with a bottom wall and extending upward therefrom about the same distance and at least one annular filter cartridge in said annulus, the lower portion of said outer wall of said container member being provided with a plurality of openings to admit aquarium liquid therethrough and the interior of said inner wall defining a sump for receiving filtered liquid;

b. a hollow cap or closure member of the same configuration as said container, and means for attaching or removing said cap to or from said container located at the upper end of said container;

c. said cap or closure member having integrally connected thereto in its central portion a downwardly extending tubular member which is open at its lower end and which extends to near the bottom of said sump, thus providing means for collecting and discharging filtered aquarium liquid, and air inlet conduit means coaxially positioned in the interior of said liquid discharge means and extending to near the bottom of said discharge means.

2. The apparatus of claim 1 wherein said filter cartridge in said annulus is of annular shape, is removable, and has dimensions to fit over the outer surface of said sump wall and within the outer wall of said container, and extends approximately the length of said container body.

3. The apparatus of claim 2 in which said filter cartridge is of annular shape and comprises a casing of a material which encloses and retains a bed of filter material and which casing permits access of the water to said filter material.

4. The apparatus of claim 1 in which said filter device comprises a series of individual filter cartridges having the configuration of trays open at the top and with a foraminous bottom, filled with material, said trays being superimposed and in communication permitting passage of water therethrough.

5. The apparatus of claim 4 which further includes an annular spacer member positioned at the bottom of the container inner wall and adapted to support said filter cartridges above the bottom wall of the container.

6. The apparatus of claim 4 which further includes a foraminous cover plate positioned on top of the uppermost filter cartridge tray.

7. In combination with an aquarium, a filter device according to claim 1.

* * * * *